Figure 1:
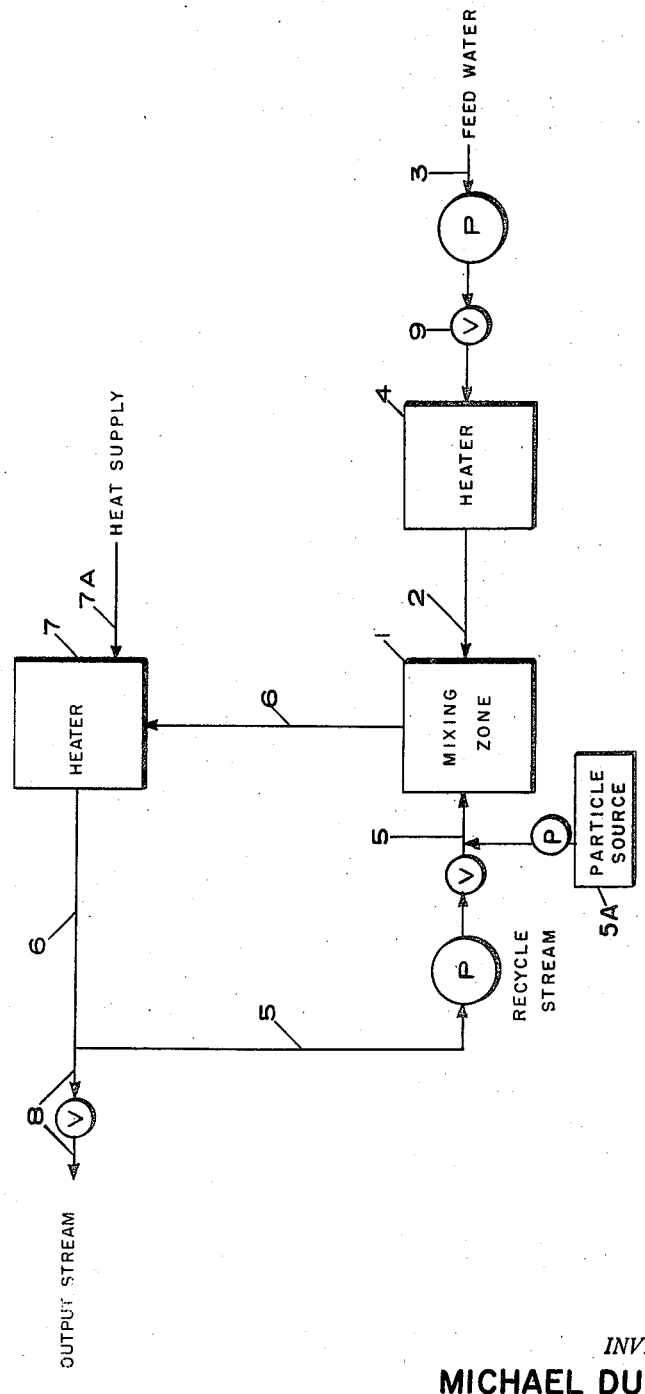

Oct. 14, 1958        M. DUBITZKY          2,856,074
            MEANS FOR HEATING SEA WATER
Filed March 4, 1954                    6 Sheets-Sheet 1

INVENTOR.
MICHAEL DUBITZKY
BY
AGENT

Oct. 14, 1958 — M. DUBITZKY — 2,856,074
MEANS FOR HEATING SEA WATER
Filed March 4, 1954 — 6 Sheets-Sheet 2

INVENTOR.
MICHAEL DUBITZKY
BY
AGENT

Oct. 14, 1958  M. DUBITZKY  2,856,074
MEANS FOR HEATING SEA WATER
Filed March 4, 1954  6 Sheets-Sheet 3

INVENTOR.
MICHAEL DUBITZKY
BY
AGENT

Oct. 14, 1958

M. DUBITZKY 2,856,074

MEANS FOR HEATING SEA WATER

Filed March 4, 1954

6 Sheets-Sheet 4

INVENTOR.
MICHAEL DUBITZKY
BY
AGENT

Oct. 14, 1958 M. DUBITZKY 2,856,074
MEANS FOR HEATING SEA WATER
Filed March 4, 1954 6 Sheets—Sheet 5

INVENTOR
MICHAEL DUBITZKY
BY
AGENT

United States Patent Office 2,856,074
Patented Oct. 14, 1958

2,856,074

MEANS FOR HEATING SEA WATER

Michael Dubitzky, Cambridge, Mass., assignor, by mesne assignments, to Texas Gulf Sulphur Company, New York, N. Y., a corporation of Texas Application March 4, 1954, Serial No. 414,019

5 Claims. (Cl. 210—175)

This invention relates to method and means for the heating of sea water and other waters containing dissolved salts, especially salts of calcium and/or magnesium which tend to form scale on the heating surfaces of conventional heat transfer means.

It is well known that when sea water is heated to temperatures above 150° F. by passing it in contact with heated surfaces, there is a strong tendency for scale to form on these surfaces. This scale is likely to contain fairly high concentrations of calcium sulphate which has been precipitated out of solution by reason of the inverse solubility curve for this material. This scale is also likely to contain calcium and magnesium carbonates and hydroxides originating from the decomposition of the respective bicarbonates. In each case, the chemical instability leading to precipitation of these scale-forming materials is caused by elevation of the temperature of the water being heated.

A basic and general object of this invention is to provide method and means for heating sea water and other waters of the class described in such a way as to cause the dissolved scale-forming salts to precipitate in the form of small particles or nuclei suspended in the water, and thus to greatly minimize, or even avoid entirely, the formation of calcium sulfate and other scale on the surfaces of the heating means.

Another object is to provide heated sea water for use in processes where there is no objection to using such water with a content of suspended solids. Such uses come into consideration especially when sea water is readily and plentifully available and fresh water is relatively scarce and expensive. A specific example of such use is in the mining of sulphur by the Frasch process from off-shore deposits.

In the mining of underground sulphur deposits by the Frasch process, large volumes of hot water heated to approximately 340° F. are pumped down into the sulphur dome to cause melting of the sulphur. The molten sulphur is lifted to the surface by means of high pressure air.

The expected life of known Continental sulphur deposits is limited and, as the result of petroleum explorations, it is known that substantial sulphur deposits exist under the sea, inside the Continental shelf, and within the Gulf of Mexico. It has been proposed to mine this sulphur from off-shore platforms or barges in a manner similar to that of the petroleum industry in obtaining off-shore oil.

To carry on such mining operations would require that sea water be heated and pumped into the deposit, since the quantity of water required is far too great to permit transportation of fresh water to the mine site. The large scale heating of sea water for this purpose, without the fouling of heat transfer surfaces, is possible in accordance with the present invention. While many other uses of the product water are possible, the foregoing illustration serves as a typical example.

In accordance with the present invention, the scale-forming constituents of the sea water or other feed water are precipitated on nuclei which are suspended in the water, rather than upon the heat transfer surfaces themselves, by procedures and apparatus which will first be described briefly, and then in detail in connection with the accompanying drawings.

Briefly stated this invention is concerned with the treatment of a liquid which contains solids which are in solution therein at normal temperatures thereof but which form a precipitate when the liquid is heated, by mixing a stream of the liquid (preferably but not necessarily at a temperature close to its boiling point) with another stream of the same liquid which is at a temperature above that at which the solids precipitate and which carries fine particles of the precipitate in suspension and which is of sufficient volume and heat content to raise the first mentioned stream to a temperature sufficient to cause precipitation of its dissolved solids as fine particles in suspension; following such mixing, the resulting mixed stream is heated to a temperature substantially that of the second mentioned stream, after which the thus-heated mixed stream is separated into two streams, the major one of which forms the second-mentioned stream and the minor one of which is the desired heated product. All of these steps take place under pressures which are at all times in excess of those required to prevent boiling of the liquids being treated.

Figure 2:
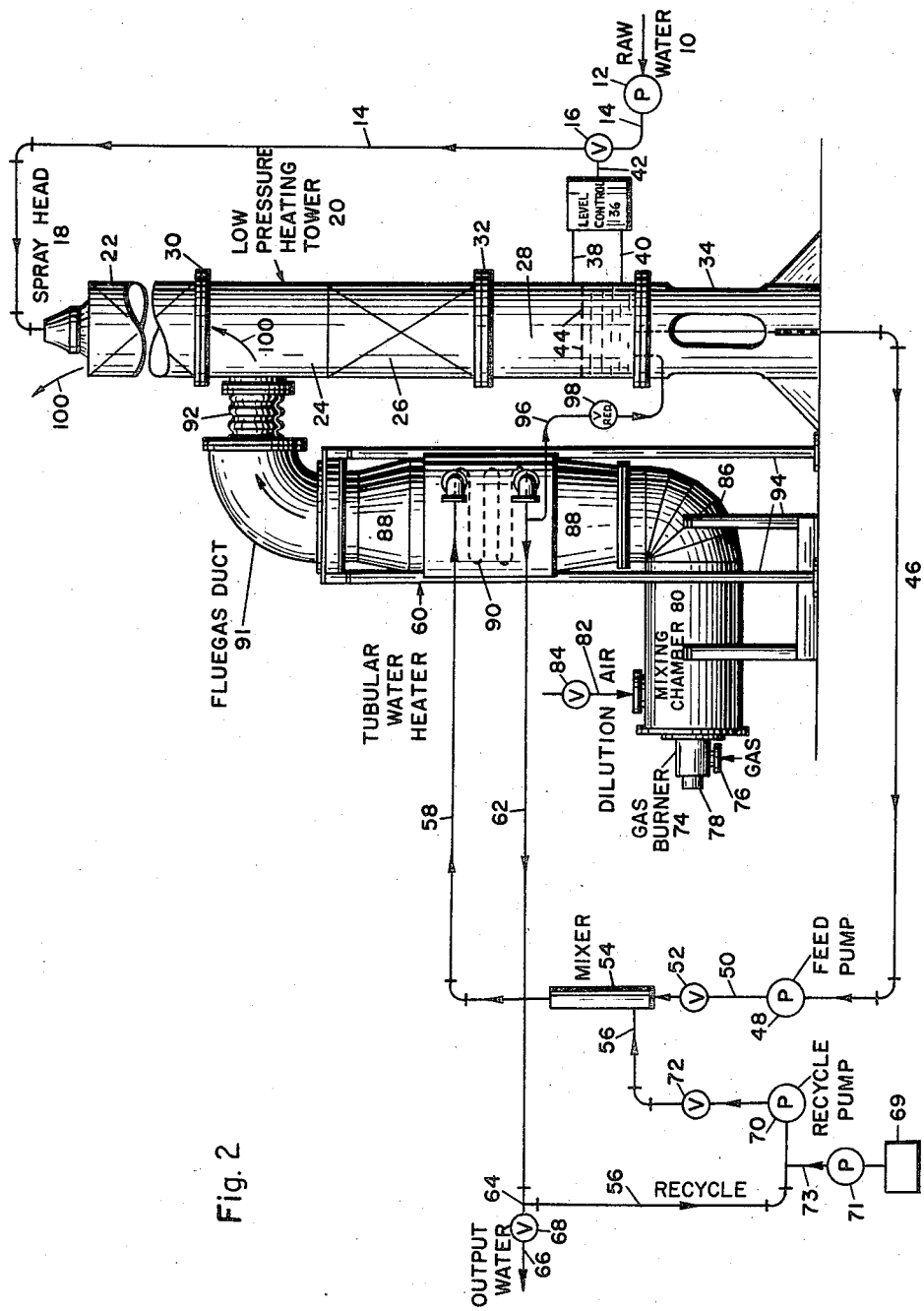
Figure 3:
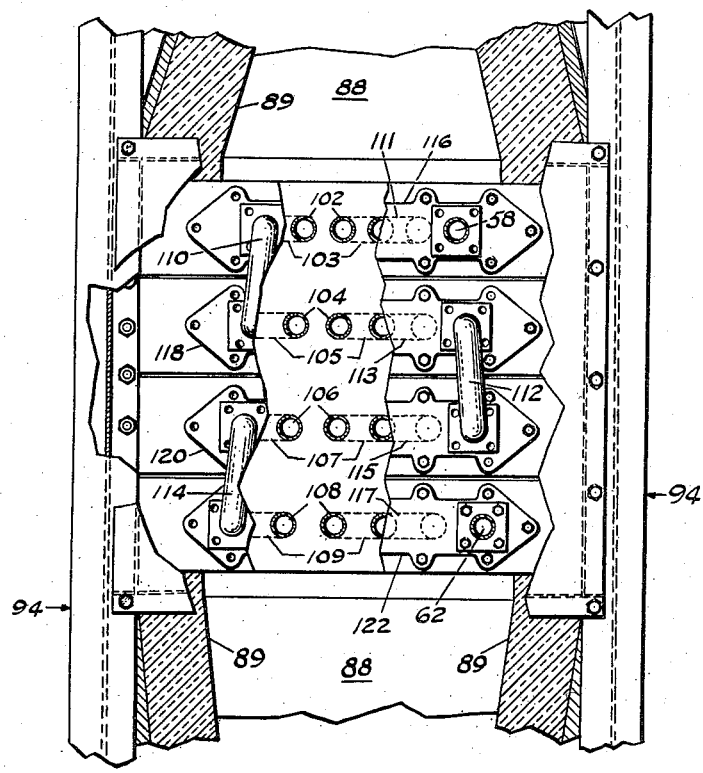

In the drawings, Fig. 1 represents a flow sheet of the basic steps in the process, Fig. 2 represents an elevational view, largely diagrammatic, of an apparatus and flow arrangement suitable for the effective performance of this invention, Fig. 3 represents a vertical cross-sectional view, enlarged, of one form of the heat exchange portion of the tubular water heater of Fig. 2, and Figs. 4 to 11 represent cross-sectional views of various forms of mixers.

Referring first to Fig. 1, the above-mentioned purposes are accomplished by mixing in a mixing zone 1 a stream 2 of the feed water 3, which has first been heated in heater 4 to a temperature below boiling at atmospheric pressure, with a substantially larger recycle stream 5 of such water which is at a considerably higher temperature. This recycle stream 5 contains nuclei of solids, such as calcium and magnesium sulphates, carbonates and hydroxides, and these nuclei serve as points upon which salts from the feed water stream 2 deposit as the temperature of the latter increases upon mixing with the recycle stream 5. The resulting mixed stream 6 is then passed through a heating zone 7 provided with heat from a suitable source 7a. In zone 7 the temperature of stream 6 is raised sufficiently to bring it up to that of the aforesaid recycle stream 5, i. e. to provide an amount of heat equivalent to that required to raise the temperature of the feed water 2 from that at which it entered the mixing zone 1 to that of the said recycle stream 5 upon the latter's entering said zone. After passage through the heating zone 7, the mixed stream 6 is separated into two parts, the larger of which is recycled as said recycle stream 5 and the smaller of which—called the output stream 8, goes to the point of use—e. g. to the mining of an underground sulphur deposit by the Frasch process. The pressures upon the various streams throughout the process are maintained at all times sufficient to prevent any boiling of the streams. Suitable control means 9 are provided so that the feed water input is maintained at substantially the same amount as that of the output stream. By this procedure and arrangement, the initially dissolved solids in the feed water deposit upon the aforesaid nuclei in and around the mixing zone 1, rather than upon the heating surfaces in the subsequent heating zone 7. The mixing zone 1 and the time of passage of the mixed stream therethrough, and also the volume of the recycle stream 5 and its content of nuclei, are such as to effect precipitation of the dissolved solids in the feed water stream 2 upon such nuclei, and/or in the form of additional nuclei, before the mixed stream enters the heating zone 7. Motion of the streams is sufficiently rapid to prevent any significant amount of deposition on the inner walls of the stream-carrying means, and also, by the abrasive action of the suspended particles, to scour away any deposits which might be formed. The aggregate volume of nuclei circulating in the recycle stream 5 is prevented from building up to any objectionable degree by the withdrawal of such nuclei in the output stream 8, since during continued operation this withdrawal is equal to the input of nuclei-forming salts from the feed stream 2. On the other hand, it may be desirable in some instances to provide a larger number of small particles or nuclei than those normally present in the recycle stream, in order to promote the aforesaid precipitation of the initially dissolved solids in the feed water upon such particles or nuclei rather than on the walls of the treating apparatus. In such instances, these particles or nuclei may be supplied to the system by suitable means such as a particle source 5a, which delivers into recycle stream 5 by suitable pump means. In essence, this is a seeding procedure.

One suitable apparatus and flow arrangement for carrying out the process of this invention is shown in Fig. 2. As there shown, a pipe 10 is provided leading from the source of sea water, or other feed water, to pump 12, whence the water is pumped via pipe 14 controlled (as hereinafter described) by valve 16 to spray nozzle or other liquid diffusing device 18. This nozzle 18 diffuses the feed water into the top of low pressure heating tower 20, which tower is preferably made of a plurality of interconnected sections 22, 24, 26, and 28. Sections 22 and 26 are packed with any suitable packing material which will assist in providing adequate liquid-gas contact, e. g. with Raschig rings. Sections 22 and 24 are joined in suitable manner as by flange 30 comprising any suitable means such as a foraminous plate for retaining the said packing in place while permitting the feed to fall downwardly through section 24, which is preferably free of packing. Packed section 26 is similarly joined to section 28 at flange or the like 32 which also similarly comprises a foraminous plate or the like. Section 28 is a sump or collection chamber, also free of packing, where the feed water collects prior to circulation to other parts of the apparatus.

Tower 20 may conveniently be mounted on a base 34.

Associated with the water level in section 28 is a liquid level control 36, communicating with the water level in section 28 by leads 38, 40 and with valve 16 by lead 42, whereby valve 16 is controlled to pass more or less feed from pump 12 according to the liquid level 44 in the lower part of section 28. Such level controls are well known and need not be described further here.

From adjacent the bottom of section 28 the feed water passes through pipe 46 to feed pump 48 whence it is forced through pipe 50 controlled by valve 52 to mixer 54, which may advantageously be of the jet mixer or vortex type. Various suitable types of mixers are described hereinafter. Valve 52 is preferably a check valve, to prevent backward flow toward or through feed pump 48 during start-up. Also communicating with mixer 54 is recycle pipe 56 through which the recycle stream, hereinafter described, is fed to the mixer. Pipe 58 carrying the mixed feed and recycle leads from mixer 54 to tubular water heater 60, and pipe 62 conveys said mixed feed and recycle from said heater 60 to T 64. Output water pipe 66, controlled by valve 68, leads from one leg of T 64, while recycle line 56 leads from the other leg of T 64 via recycle pump 70 to mixer 54. Recycle line 56 is controlled by valve 72.

As mentioned above in the description of particle source 5a, Fig. 1, I may similarly, in the system of Fig. 2, provide a particle source 69, in the form of a tank or reservoir of any suitable type, communicating with recycle line 56 by line 73, in which is a pump 71 which serves to introduce the particle-carrying fluid into line 56. This pump must provide sufficient pressure to introduce the particle-carrying fluid into line 56 against the pressure in the latter line. As a rule, the preferred material to use as the particle source is a slurry or suspension of finely divided particles of the substances which are tending to crystallize out of the feed water, because crystal growth is best induced by using crystals of the substance itself for seeding. In the case of sea water, however, the substances which crystallize out are varied and complex, and differ as between different types of sea water as well as different heating conditions and different treating equipment. In general, however, they are sulphates, carbonates, and/or hydroxides of calcium and magnesium. I may therefore use particles of any one of preferably a mixture of such compounds, for the processing of sea water in accordance with this invention. It is also desirable that these particles be as small as possible, in order to present the greatest possible surface area per unit weight thus introduced. There are a number of methods known for producing the desired type of slurry or suspension of fine particles. For example, the substance or substances constituting such particles may be prepared by fine grinding, and the resulting powder made up into a slurry, or the substance or substances may be formed by precipitation or coprecipitation, in the slurry-forming fluid, from two or more soluble compounds. This introduction of slurry into recycle stream 56 should not effect any appreciable cooling of the recycle stream. To avoid such cooling, the slurry should be heated if the quantity thereof is more than a relatively small fraction of the volume of the recycle stream, e. g. enough to lower its temperature by more than say 10° F.

Tubular water heater 60 is provided with a gas burner 74 having a gas inlet 76 and an air inlet 78. The burning gas emerges into mixing chamber 80 into which dilution air is fed through duct 82 controlled by valve 84. The mixing chamber 80 communicates through bend 86 with the main vertical section 88 of heater 60; hence the heating surfaces located in section 88 are not exposed to direct radiation from the flames of the burning gas, although the heater may be so arranged, if desired, that said heating surfaces are so exposed. Within section 88 are tubes 90 leading from pipe 58 to 62, through which tubes the mixed feed and recycle flows. These tubes are preferably arranged to be progressively more closely packed from the bottom towards the top, so that as the heated gases pass through them and become cooled in their upward passage, and hence decrease in volume, the velocity of those gases is nevertheless increased so as to promote uniform heat exchange between those gases and the tube contents and maintain uniform wall temperatures at all points. One suitable arrangement of tubes 90 is shown in Fig. 3, which is described hereinafter.

At the top of section 88 of heater 69 is flue gas duct 91, which opens at its lower end into section 88 and at its upper end via passage 92 into section 24 of tower 20. Passage 92 is preferably in the form of a bellows or similar expansible or flexible connection so as to accommodate differential expansion and shrinkage between heater 60 and tower 20 during and between operations.

Supporting means 94 may be provided for heater 60.

A by-pass line 96 is advantageously provided from pipe 62 to the bottom of section 28 of tower 20. This by-pass line is provided with a reducing valve 98 whereby the pressure in the line is reduced from that of the liquid in pipe 62 to substantially atmospheric, thereby flashing the by-passed liquid into vapor which bubbles up through the tower 20 and assists in deaerating the feed water therein.

A number of arrangements are possible for the heating zone 7 of Fig. 1 and for the bank of tubes 90 shown in Fig. 2. Fig. 3 illustrates in detail one suitable arrangement of the bank of tubes 90 within section 88. As there shown, the bank of tubes is composed of four rows of pipes 102, 104, 106, and 108 (reading from top to bottom). The pipes in each such row are joined by rear passageways 103, 105, 107 and 109 and front passageways 111, 113, 115, and 117 to provide a continuous flow path in each row, and each row is joined to the one next below by end connections 110, 112, and 114. The pipes are held in place by suitable front headers 116, 118, 120 and 122, and corresponding rear headers (not shown). The aforesaid passageways are within the headers, the front passageways being within the front headers and the rear passageways within the rear headers.

Liquid enters through pipe 58 into row 102, passing from pipe to pipe thereof through connection 103, thence through connection 110 to row 104, and so on to row 106 and to row 108, emerging into pipe 62.

The pipes throughout the various rows are all of the same size, but it will be noted that the distances between the pipes in any given row are greater than those between the pipes in the next higher row and less than those between the pipes in the next lower row. The inner walls 89 of section 88 are also tapered so as to provide a decreasing inside cross-sectional area of said section from bottom to top of the bank of tubes. Therefore, the cross-sectional area of the pasageway for combustion gases upwardly through the tube section of 88 decreases in an upwardly direction. This decrease is more than sufficient to compensate for the decreased volume of the gas as it is cooled by contact with the tubes, so that the gases as they cool will actually increase in velocity, thereby promoting uniform rates of heat exchange between the gases and the tubes and their contents, and maintaining substantially uniform wall tube temperatures at all points, as already pointed out.

Another suitable arrangement is that wherein the heating zone 7 (Fig. 1), provided with coils or tubes such as tubes 90 (Fig. 2) through which the mixed stream 6 flows, is heated by compressed steam at suitable pressure and temperature from supply 7a. This steam may be introduced in any convenient fashion and circulated around the tubes 90 so as to provide substantially uniform wall temperatures throughout the length and area of said tubes.

Alternatively, heat supply 7a may be electrical, and the heating of the tubes may be accomplished by controlled radiant heating.

The preferred type of mixer 54 is one wherein the entering feed is surrounded by the entering recycle liquid so that the feed is largely kept away from the walls of the mixer until it has reached substantially equilibrium temperature with the recycle liquid and its scale-forming substances have been precipitated on the nuclei of the recycle liquid or have formed additional nuclei. In this way, precipitation of scale on the walls of the mixer is minimized. Another very satisfactory type of mixer 54 is the jet or injection type, wherein the scouring action of the rapidly-moving stream of water and contained particles serves to keep the inner surfaces of the mixer free from any substantial accumulation of scale. Other types of mixers may also be used than those just mentioned, but frequently they entail some difficulties due to an undesirable amount of scaling on their inner surfaces.

Various types of mixers 54 are illustrated in some detail in Figs. 4 to 11 inclusive, wherein the numerals common to these figures and to Fig. 2 represent the same features.

Figure 4:
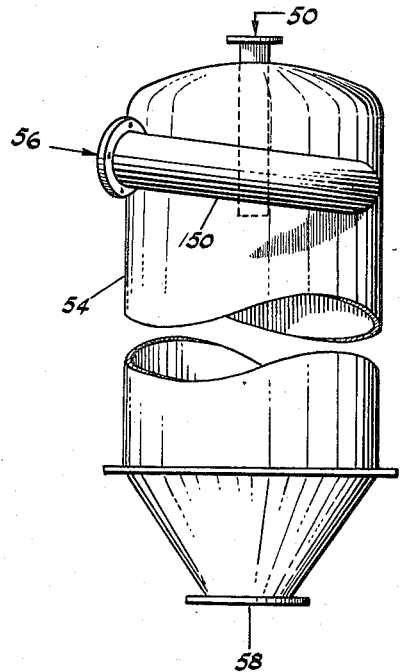
Figure 5:
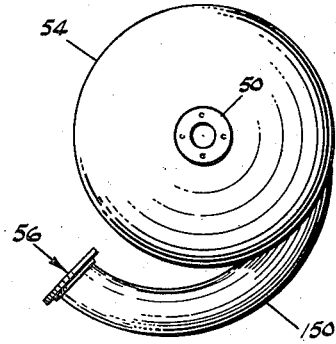

Fig. 4 represents a side view, and Fig. 5 an end view, of a vortex-type mixer 54 into which the feed enters at 50 and the recycle liquid at 56 through curved arm 150. The recycle liquid is thus given a tangential motion around the inside wall of mixer 54, surrounding the stream of entering feed until the latter has had its temperature raised substantially and precipitation of the originally dissolved scale-forming substances has taken place on or as nuclei. The mixed stream is discharged at 58.

Figure 6:
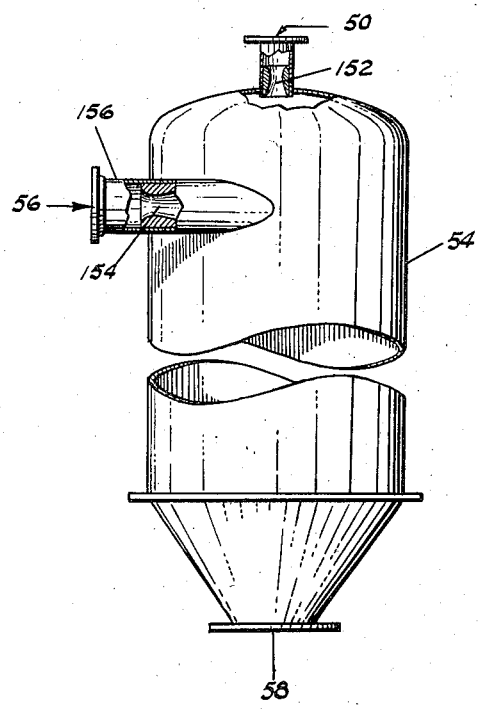
Figure 7:
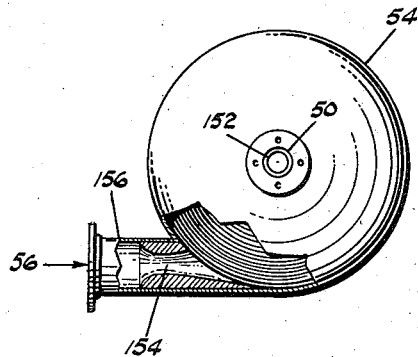

Fig. 6 represents a side view, and Fig. 7 an end view (each partly in section) of another vortex-type mixer 54, wherein feed 50, recycle liquid 56, and mixed stream discharge 58 are as in Figs. 4 and 5, except that the feed and recycle are forced in through orifices 152 and 154 respectively, the latter being in tangential pipe 156. These orifices give a more positively directional flow to the incoming liquids than is the case in the device of Figs. 4 and 5, so that the incoming feed is kept out of contact with the walls of the mixer for a longer time.

Figure 8:
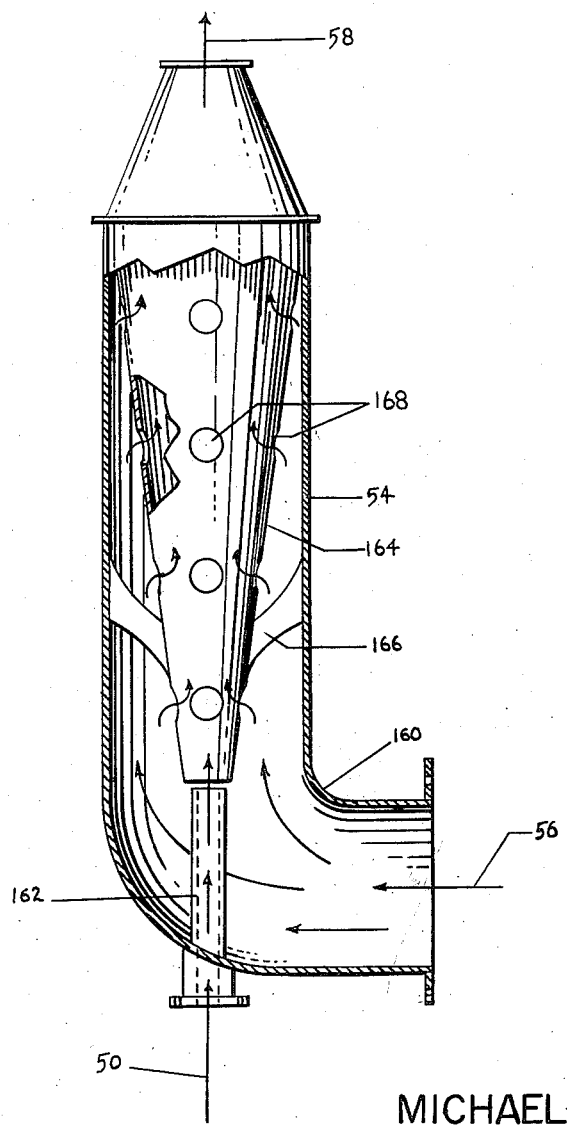

In Fig. 8 is shown a turbulent stepwise mixer 54 of generally cylindrical form, provided at one end with passageway 160 through which recycle stream 56 enters, and pipe 162 through which feed 50 enters. Pipe 162 is surrounded by the entering recycle stream, and discharges into conical member 164 which flares outwardly toward the other (discharge) end of mixer 54. Conical member is supported by suitable struts 166, and is provided with holes 168. Inasmuch as conical member 164 meets the inner wall of mixer 54 near the discharge end, the recycle liquid must pass through the holes 168. As it does so, it tends to form a liquid wall around the incoming feed, keeping the latter away from the walls until the aforementioned precipitation as or on nuclei, rather than on the walls, has taken place.

Figure 9:
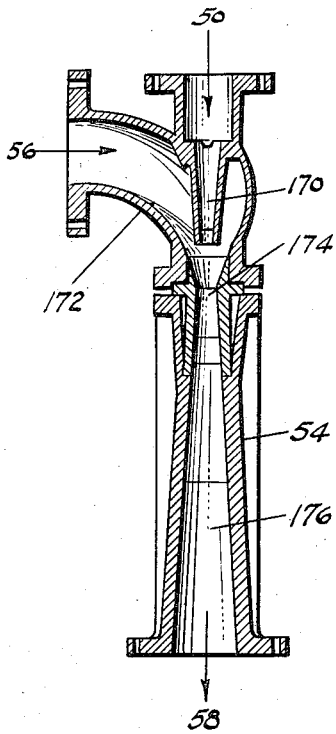

Fig. 9 is a cross-sectional view of a conventional type of jet mixing device which is also suitable for the purposes of this invention. In Fig. 9, mixer 54 is provided with a jet nozzle 170 through which feed 50 is impelled, thereby providing jet action which assists in the introduction of recycle stream 56 through side arm 172. Mixing takes place in throat 174 and in delivery cone 176. In the device of Fig. 9, scaling is prevented primarily because of the scouring action of the rapidly-flowing liquids and their contained nuclei upon the inner walls of the mixer, although here also, as in the devices of the preceding Figs. 4–8 inclusive, the recycle stream tends to surround the feed at least in the initial stages of contact.

Figure 10:
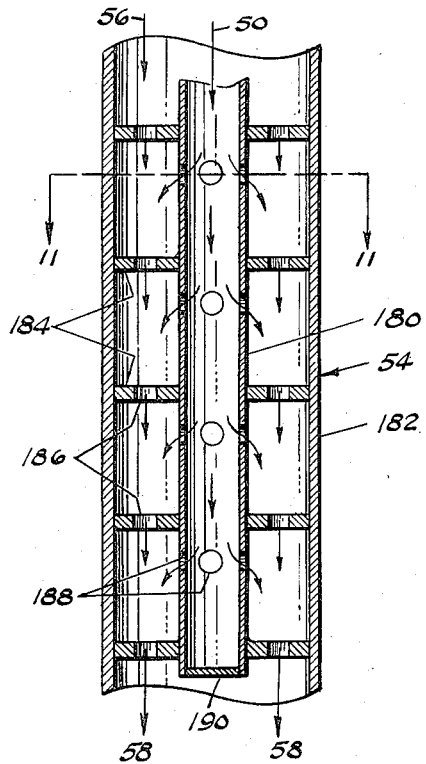
Figure 11:
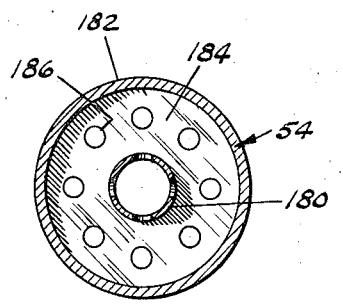

Another type of mixing device, of the turbulent mixer variety, is shown in Figs. 10 and 11, Fig. 10 representing a longitudinal cross-sectional view thereof, and Fig. 11 a transverse cross-sectional view along line 11—11 of Fig. 10. In this illustration, mixer 54 consists of two spaced-apart concentric cylindrical conduits, an inner conduit 180 for feed 50 and an outer conduit 182 into which the recycle stream 56 is introduced. These conduits are held apart by spacers 184, which are provided with holes 186. Inner conduit 180 is also provided with holes 188, and is blocked at end 190 so that the feed is forced out from conduit 180 through holes 188 into the annular space between the conduits. The mixed streams travel through this space to discharge at 58, and their passage through holes 186 serves to mix them thoroughly. This mixing device shown in Figs. 10 and 11 is not generally as satisfactory as those of Figs. 4–9 inclusive from the point of view of scale formation on the walls, since the feed is in contact with the walls of conduit 180 throughout, and since the scouring action of the streams is not as vigorous as in the jet mixer of Fig. 9. This device is nevertheless reasonably satisfactory in many instances, as for example when the volume of recycle is very high relative to feed, or when the content of dissolved scale-forming substances in the feed is relatively low.

The process of this invention may be carried out in the apparatus shown in Fig. 2 in the following manner, with sea water feed as an example: Sea water is delivered from any suitable source by pump 12 to spray head or nozzle 18, whence it is directed downwardly through packed section 22 of tower 20 counter-currently and in direct contact with the rising stream of hot gases 100 entering tower 20 from duct 91 of heater 60. The sea water is thereby heated to an elevated temperature but below the point at which it boils at atmospheric pressure, e. g. to about 212° F. Since the heated water may contain dissolved gases initially present or added by gas stream 100, these may be largely removed by releasing sparge steam into the bottom of section 28 from line 96. The heated sea water feed is then drawn off through line 46 and is passed through feed pump 48 where its pressure is raised to a point sufficient to prevent any boiling during the subsequent treatment. The feed is then intimately mixed in mixer 54 with a relatively large flow (say 3½ to 7 times its volume) of hot recycle sea water impelled by pump 70 through line 56. The feed is thereby raised substantially in temperature, without coming in contact with any fixed heat transfer surface. The recycle stream carries a suspension of fine particles or nuclei formed by previous precipitation of scale-forming substances during its earlier circulation in the cycle. During the mixing of the feed and recycle streams, the scale-forming substances in the feed stream which have become unstable due to elevation of temperature of the latter are precipitated on the nuclei, and also form additional nuclei. The mixing zone 54 is made sufficiently large and effective that precipitation and nucleus formation are substantially completed and little or no chemical instability remains in the mixed stream as it enters tubular heater 60. Within the tubular heater, the mixed stream is raised only a few degrees, sufficient to provide an amount of additional heat in the mixed stream which is equivalent to that necessary to raise the temperature of the feed stream to that of the recycle stream, as already mentioned. Since chemical instability due to temperature rise in the tubular heater 60 is substantially absent, the scale-forming tendency is extremely small as compared with what it would be if the feed were heated directly from its temperature in line 46 to that on emerging from heater 60.

By suitable design and arrangement of the components of tubular heater 60, the hot gases from burner 74 are controlled to the desired temperature by dilution air in the mixing chamber 80, and a portion of the heat from these gases is given up to coils 90 and the balance to the incoming feed in section 22 of tower 20.

By proper operation and control of valve 68, a desired minor portion of the mixed stream from pipe 62 is taken off as output water, and the major portion goes into line 56. Operation of valve 68 controls the flow through the entire system, since the amount of output water determines the amount of feed water entering from line 46 and hence withdrawn from section 28, and the liquid level in the latter controls, through valve 16, the input of sea water to the system.

As an example of specific operating conditions, the sea water may be fed in through pump 12 at the rate of 70 gallons per minute, at 80° F. and 30 p. s. i. g. Its temperature is raised to 212° F. in tower 20, whence it passes to pump 48 where its pressure is raised to 130 p. s. i. g., or substantially above the saturation pressure (121 p. s. i. g.) thereof at the highest temperature (340° F.) which the liquid reaches in heater 60. The 70 gallons per minute of feed emerging from pump 48 is mixed with about 350 gallons per minute of recycle feed at 340° F. in mixer 54, and the combined feeds, at about 320° F. and at a pressure of 130 p. s.i. g., pass to heater 60. There they are raised to about 340° F., and emerge at that temperature into pipe 62, still at 130 p. s. i. g. pressure. Valve 68 is set to deliver 70 gallons per minute of output water, at 340° F. and 130 p. s. i. g., to the sulphur mine or other end use. The balance of the liquid in pipe 62 becomes the aforesaid recycle feed. The temperature of the gases emerging from the mixing chamber 80 is controlled to about 1900° F.; these gases give up about half of their heat to tubes 90 and the liquid therein, and emerge from duct 91 into tower 20 at about 1000° F. Most of the rest of the heat of these gases is given to the incoming sea water feed in section 22.

The relative proportions of feed and recycle entering mixer 54 can be varied over a considerable range, and will be determined largely by the amount by which it is desired to raise the temperature in heater 60. A ratio of 3 volumes of recycle to one of feed is about as low as it is safe to go without causing undue scale formation in tubes 90, although in some instances, where the nature of the feed water is such that scale formation is less serious than in the case of the average sea water, this ratio may be as low as 2 to 1. On the other hand, the upper ratio is determined chiefly by size and cost of equipment; apart from such practical considerations it could be even 100 to 1 or higher.

Many modifications in the apparatus and procedure herein described will be obvious to those skilled in this art, it being understood that the drawings are largely diagrammatic and that various changes may be made therein and in the procedural steps without departing from the spirit of the invention as set forth in the appended claims. In some instances, such as when the raw feed is relatively hot to begin with, the heating step in tower 20 may be reduced or eliminated. Also, as shown in Fig. 1, heater 4 and heater 7 may be heated independently of each other; for example, the heat supply 7a may be in the form of high-pressure steam, or electrical energy, while the heat supply to heater 4 may be in the form of hot gases exhausted from some other operation. Mixing chamber 80 may be directly below section 88, in which instance tubes 90 may be exposed to direct radiation from the flame of the gas burner 74, or baffles may be provided to cut off such radiation.

I claim:

1. Apparatus for heating sea water, comprising a column having packing in the upper part thereof, means for introducing a feed stream of said sea water in the form of a spray into the top of said column above said packing, means for introducing hot gases into said column below said packing for upward passage through said packing in countercurrent direct heat exchange relation with said feed stream, means for collecting the resulting heated feed stream at the bottom of said column, a mixing chamber for mixing said feed stream with a recycle stream, a first conduit means communicating between the bottom of said column and said mixing chamber, pump means associated with said first conduit means for withdrawing said feed stream from the bottom of said column and conveying it through said first conduit means to said mixing chamber and for raising the pressure of said feed stream above atmospheric, heater means for heating the resulting mixture of said feed stream and a recycle stream by out-of-contact heat exchange with hot gases, a second conduit means communicating between said mixing chamber and the inlet of said heater means to conduct said mixture from said mixing chamber to said heater means, and a third conduit means extending from the outlet of said heater means and being divided into two branched conduit means, one of said branched conduit means communicating with, and conducting said recycle stream to, said mixing chamber, the other of said branched conduit means leading out of the system.

2. Apparatus in accordance with claim 1, wherein means are provided for leading the hot exhaust gases out of said heater means into said column for heating the feed therein.

3. Apparatus in accordance with claim 1, wherein a by-pass line is provided extending from said third conduit means at a point beyond the outlet of said heater means to the bottom of said column, said by-pass line being provided with pressure-reducing means.

4. Apparatus in accordance with claim 1, wherein said mixing chamber comprises means for introducing said heated feed water in a stream and means for introducing said recycle water in the shape of a sheath which initially surrounds said stream and spaces it away from the walls of said mixing chamber.

5. Apparatus in accordance with claim 4, wherein said mixing chamber is in the form of an injector, wherein said heated feed water forms the central injecting stream and said recycle water forms the sheath surrounding said injected stream.

(References on following page)

References Cited in the file of this patent

UNITED STATES PATENTS

| | | |
|---|---|---|
| 13,628 | Weissenborn | Oct. 2, 1855 |
| 532,884 | Leffler | Jan. 22, 1895 |
| 550,425 | Snyder | Nov. 26, 1895 |
| 781,838 | Lone | Jan. 7, 1905 |
| 1,059,430 | Brazda et al. | Apr. 22, 1913 |
| 1,059,431 | Brazda et al. | Apr. 22, 1913 |
| 1,083,740 | Hodges | Jan. 6, 1914 |
| 1,099,433 | Erith | June 9, 1914 |
| 1,219,320 | Jacobus | Mar. 13, 1917 |
| 1,951,015 | Gibson | Mar. 13, 1934 |
| 2,066,348 | Hays | Jan. 5, 1937 |
| 2,138,345 | Rohlin | Nov. 29, 1938 |
| 2,348,668 | Wilson | May 9, 1944 |
| 2,372,992 | Wallis | Apr. 3, 1945 |
| 2,500,774 | Sebald | Mar. 14, 1950 |